(12) United States Patent
Wu et al.

(10) Patent No.: US 6,759,461 B2
(45) Date of Patent: Jul. 6, 2004

(54) PHENOLIC PHOSPHITE ANTIOXIDANTS AND POLYMER COMPOSITIONS CONTAINING SAID ANTIOXIDANT

(75) Inventors: Tseng-Rong Wu, Tao-Yuan (TW); Pin-Yang Yu, Tao-Yuan (TW); Yi-Chin Lin, Tao-Yuan (TW); Te-Chuan Chang, Tao-Yuan (TW)

(73) Assignee: Chung-Shan Institute of Science & Technology, Tao-Guan (TW)

( * ) Notice: Subject to any disclaimer, the term of this patent is extended or adjusted under 35 U.S.C. 154(b) by 21 days.

(21) Appl. No.: 10/196,188

(22) Filed: Jul. 17, 2002

(65) Prior Publication Data

US 2004/0014852 A1 Jan. 22, 2004

(51) Int. Cl.$^7$ ................................................. C08K 5/52

(52) U.S. Cl. .................. 524/150; 252/400.24; 524/128; 558/70; 558/95; 558/155; 558/156

(58) Field of Search ................................. 524/128, 150; 252/400.24; 558/70, 78, 95, 155, 156

(56) References Cited

U.S. PATENT DOCUMENTS

| 4,474,917 A | * 10/1984 | Burton | 524/152 |
| 4,526,918 A | * 7/1985 | Burton | 524/150 |
| 4,670,492 A | * 6/1987 | Nakahara et al. | 524/119 |

* cited by examiner

Primary Examiner—Judy M. Reddick
(74) Attorney, Agent, or Firm—Bacon & Thomas, PLLC

(57) ABSTRACT

A novel antioxidant has the advantages of both the hindered phenols and the phosphite antioxidant is prepared from phosphorus trichloride and 2,5-di-tert-butylhydroquinone, such as tetrakis-(2,5-di-tert-butyl-4-hydroxyphenyl)-2,5-di-tert-butyl-hydroquinonediyl diphosphite.

8 Claims, 1 Drawing Sheet

PHENOLIC PHOSPHITE ANTIOXIDANTS AND POLYMER COMPOSITIONS CONTAINING SAID ANTIOXIDANT

FIELD OF THE INVENTION

The present invention is related to synthesis of a novel series of phenolic phosphite compounds, and their use as an antioxidant for a polymer.

BACKGROUND OF THE INVENTION

The oxidation reaction is present in every stage of the life cycle of the polymer such as synthesis, processing and final application. There are several different approaches to reduce the speed of or prevent the oxidation reaction and addition of antioxidants seems to be the most convenient way to retard the oxidation reaction. Hindered phenols, used as processing and long-term stabilizers, are the most favored type of primary antioxidants for thermoplastics, while organic phosphites are used as efficient processing stabilizers for polyolefin protection on a wide commercial scale. Traditionally, the combination of radical scavenger (hindered phenols) with hydroperoxide decomposer (organophosphites) has been widely used by the polymer industry to provide a powerful synergism for the protection of polymers.

Low molecular weight hindered phenol can be easily removed from the polymer by migration and volatilization, while these can be reduced for the large enough molar mass.

U.S. Pat. Nos. 4,474,917 and 4,526,918 disclose a large molar mass phenolic phosphite antioxidant prepared by forming a sodium salt of 1,3,5-trimethyl-2,4,6-tris(3,5-di-tert-butyl-4-hydroxybenzyl)benzene, and reacting a phosphorus trihalide, preferably PCl₃, with the heated sodium salt. The price of 1,3,5-trimethyl-2,4,6-tris(3,5-di-tert-butyl-4-hydroxbenzyl)benzene and the use of NaH for forming the sodium salt render this prior art antioxidant less competitive in the market.

SUMMARY OF THE INVENTION

A primary objective of the present invention is to provide a novel series of phenolic phosphite compounds.

Another objective of the present invention is to provide a polymer composition comprising a phenolic phosphite compound as an antioxidant.

A further objective of the present invention is to provide a method for synthesizing a novel series of phenolic phosphite compounds.

In order to accomplish the aforesaid objectives a novel series of phenolic phosphite compounds having the following formula (I), (II) or (III):

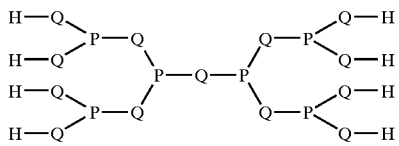

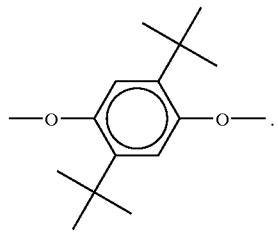

wherein Q is

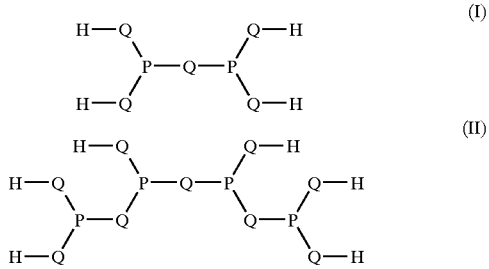

Preferably, the phenolic phosphite compounds of the present invention have a structure of the formula (I).

Preferably, the phenolic phosphite compounds of the present invention have a structure of the formula (II).

Preferably, the phenolic phosphite compounds of the present invention have a structure of the formula (III).

The present invention also provides a polymer composition comprising a polymer and 0.01–5% of a phenolic phosphite compound having a formula (I), (II) or (III) as an antioxidant, based on the weight of the polymer.

The phenolic phosphite compounds of the present invention have advantages of both the hindered phenol and the phosphite antioxidants, and a relatively easier synthesis procedures, and thus a lower production cost.

DETAILED DESCRIPTION OF THE PREFERRED EMBODIMENTS

Figure 1:
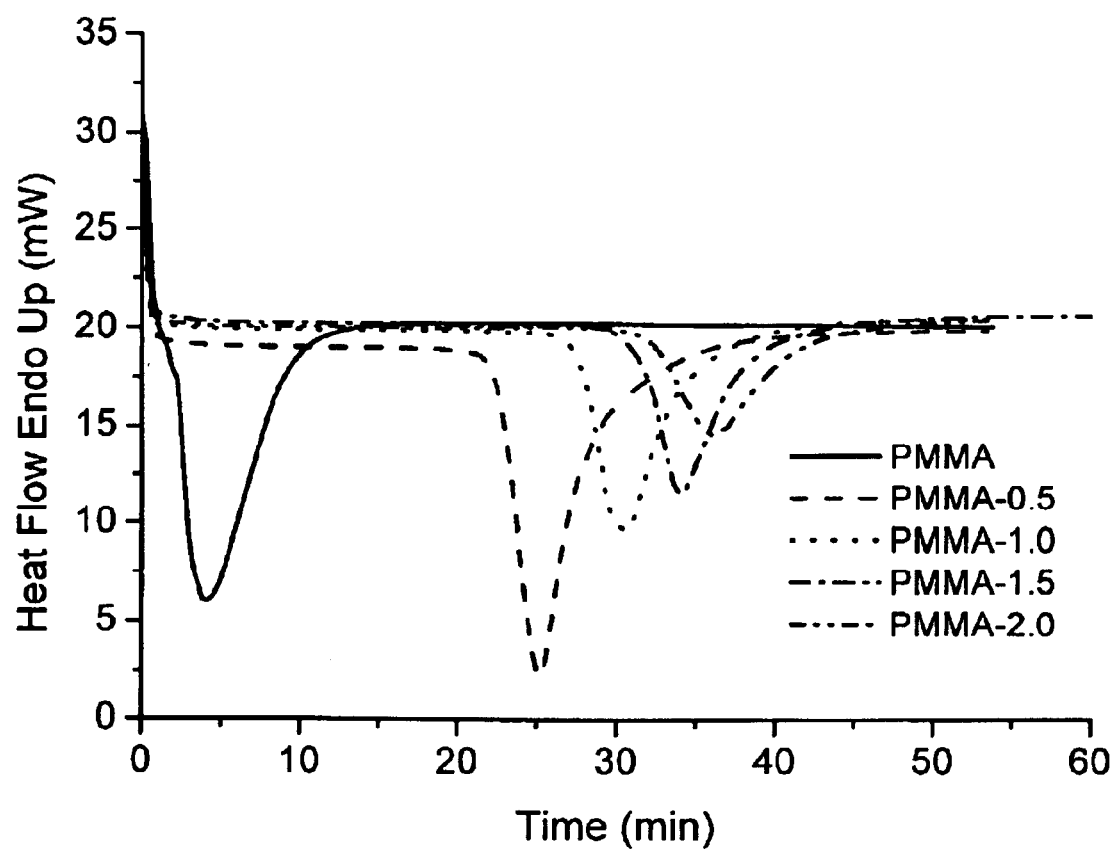
FIG. 1 shows the results of differential scanning calorimeter (DSC) of poly(methyl methacrylate) (PMMA) composition, wherein solid line represents PMMA free of antioxidant; - - - represents a PMMA composition containing 0.5 wt % antioxidant; . . . represents a PMMA composition containing 1.0 wt % antioxidant; _._._. represents a PMMA composition containing 1.5 wt % antioxidant; and _.._.._.. represents a PMMA composition containing 2.0 wt % antioxidant.

The present invention synthesizes phenolic phosphite compounds having the structures represented by the aforesaid formulas (I), (II) or (III).

A suitable method for synthesizing the phenolic phosphite compounds having the structure of formula (I) comprises, as shown in Scheme 1, reacting 2,5-di-tert-butylhydroquinone (BHQ) with an excess amount of phosphorus trichloride (PCl₃) by adding slowly BHQ to PCl₃, wherein the molar ratio of PCl₃ to BHQ is of 2–10; evaporating or distilling unreacted PCl₃ out of the reaction mixture; and reacting the resulting bis(phosphorus dichloride) (Cl₂P—Q—PCl₂, Q is defined as above) with BHQ by adding slowly bis(phosphorus dichloride) to BHQ, wherein the molar ratio of BHQ to bis(phosphorus dichloride) is of 3.8–4.0, and the completeness of the reaction is confirmed by the absence of P—Cl bond in ³¹P NMR.

Scheme 1

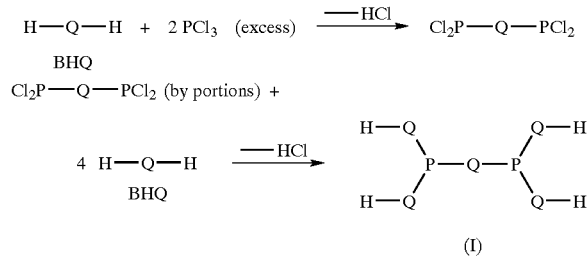

wherein Q is defined as above.

A suitable method for synthesizing the phenolic phosphite compounds having the structure of formula (II) comprises, as shown in Scheme 2, reacting BHQ with $Cl_2P$—Q—$PCl_2$ by adding slowly BHQ to $Cl_2P$—Q—$PCl_2$, wherein the molar ratio of $Cl_2P$—Q—$PCl_2$ to BHQ is of 2; and reacting the resulting product with BHQ in a molar ratio of 1:5–1:6 of by adding slowly BHQ to $Cl_2P$—Q—$PCl_2$, wherein the completeness of the reaction is confirmed by the absence of P—Cl bond in $^{31}P$ NMR.

Scheme 2

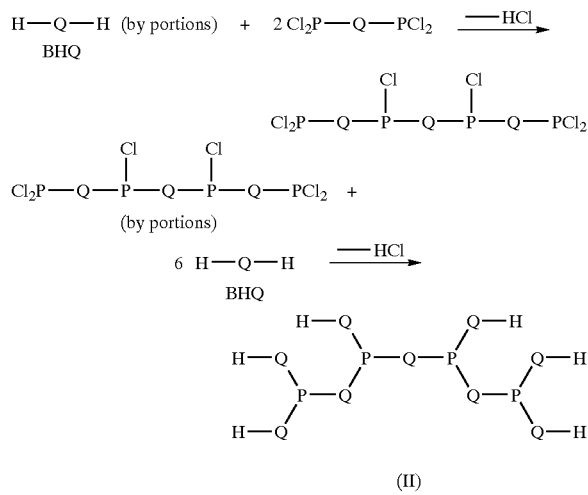

wherein Q is defined as above.

A suitable method for synthesizing the phenolic phosphite compounds having the structure of formula (III) comprises, as shown in Scheme 3, reacting the compound (I) with an excess amount of phosphorus trichloride ($PCl_3$) by adding slowly the compound (I) to $PCl_3$, wherein the molar ratio of $PCl_3$ to compound (I) is of 4–10; evaporating or distilling unreacted $PCl_3$ out of the reaction mixture; and reacting the resulting $(Cl_2P$—$Q)_2P$—Q—$P(Q$—$PCl_2)_2$ with BHQ by adding slowly $((Cl_2P$—$Q)_2P$—Q—$P(Q$—$PCl_2)_2$ to BHQ, wherein the molar ratio of BHQ to $((Cl_2P$—$Q)_2P$—Q—P (Q—$PCl_2)_2$ is of 7–8, and the completeness of the reaction is confirmed by the absence of P—Cl bond in $^{31}P$ NMR.

Scheme 3

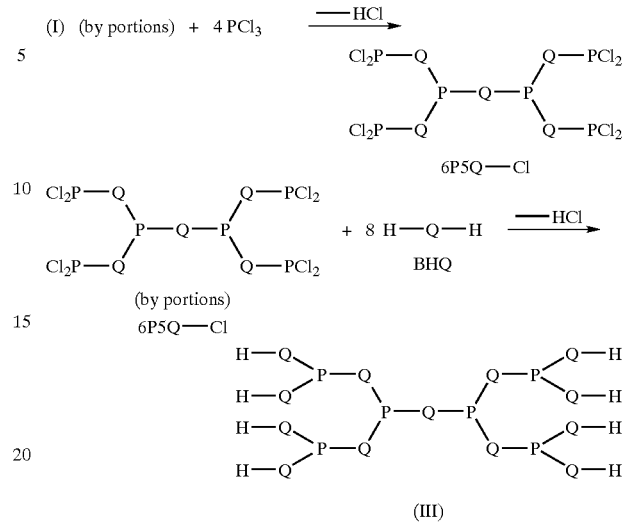

wherein Q is defined as above.

Preferably, the products obtained in Schemes 1 to 3 are washed by alcohol to remove any residual hydrogen chloride, wherein a suitable alcohol may be methanol, ethanol, n-propanol or isopropanol.

EXAMPLE 1

Synthesis of $Cl_2P$—Q—$PCl_2$ (Scheme 1)

To a two necked flask $PCl_3$ (68.78 g, 0.5 mol) and chlorobenzene (30 g) were added, and heated to reflux under nitrogen while stirring with a magnetic stirrer. BHQ (22.24 g, 0.1 mol) was added to the solution carefully in small portion. The reaction mixture was refluxed for four hours and then allowed to cool to extract the excess $PCl_3$ in vacuo. The solution containing $Cl_2P$—Q—$PCl_2$ was obtained. In $^{31}P$ NMR analysis, it was found an adsorption positon at 183.1 ppm, and a molar purity of 96%.

EXAMPLE 2

Synthesis of Compound (I) (Scheme 1)

BHQ (84.17 g, 0.392 mol) and chlorobenzene (100 g) were added to another two necked flask, and heated to reflux under nitrogen while stirring with a magnetic stirrer. The solution containing $Cl_2P$—Q—$PCl_2$ from Example 1 was added carefully in small portion. The reaction mixture was refluxed for 24 hours. More BHQ (2.23 g, 0.01 mol) was added and refluxed for four hours based on the $^{31}P$ NMR spectrum of the reaction mixture. The reaction mixture was allowed to cool to room temperature, and product that precipitated out was removed by filtration, washed twice with chlorobenzene, once with isopropanol, and dried in vacuo to obtain tetrakis-(2,5-di-tert-butyl-4-hydroxyphenyl)-2,5-di-tert-butyl-hydroquinonediyl diphosphite) (I). IR(KBr): 927, 1163 $cm^{-1}$ (P—O-ph); $^{31}P$ NMR: 132.8 ppm; FAB-MS m/z: 1167 $([M+H]^+)$.

EXAMPLE 3

Synthesis of Compound (II) (Scheme 2)

To a two necked flask half of the solution containing $Cl_2P$—Q—$PCl_2$ prepared in Example 1 (0.05 mol) wase added, and heated to reflux under nitrogen while stirring with a magnetic stirrer. BHQ (5.3 g, 0.024 mol) in 10 ml chlorobenzene was added to the solution carefully in small portion. The reaction mixture was refluxed for four hours. Based on $^{31}$P NMR analysis of the reaction mixture, it was added carefully in small portion to another two necked flask containing 31 g BHQ (0.14 mol) in 50 ml chlorobenzene, and refluxed under nitrogen for eight hours. In $^{31}$P NMR analysis of the reaction mixture, no P—Cl bond was found and a chemical shift at 131 ppm was found. The product was washed with chlorobenzene and isopropanol, and dried in vacuo to obtain compound (II). FAB-MS m/z: 2111([M+H]$^+$).

EXAMPLE 4

Synthesis of Compound (III) (Scheme 3)

PCl$_3$ (14 g, 0.102 mol) and chlorobenzene (30 g) were added to a three necked flssk, and heated to reflux under nitrogen while stirring mechnically. Compound (I) (6.1 g, 0.005 mol) in 30 ml chlorobenzene was added carefully in small portion to the flask, and the reaction mixture was refluxed for four hours, and allowed to cool to room temperature. The cooled reaction mixture was distilled to remove unreacted PCl$_3$ to obtain a solution containing an intermediate product of 6P5Q-Cl. BHQ (8 g, 0.036 mol) and chlorobenzene (50 ml) were added to a two necked flask, and heated to reflux under nitrogen while stirring with a magnetic stirrer. The solution containing 6P5Q-Cl was added carefully in small portion to the flask. The reaction mixture was refluxed for 8 hours. More BHQ (0.72 g, 0.003 mol) was added and refluxed for four hours based on the $^{31}$P NMR spectrum of the reaction mixture. In $^{31}$P NMR analysis of the reaction mixture, no P—Cl bond was found and a chemical shift at 129 ppm was found. The reaction mixture was allowed to cool to room temperature, and product that precipitated out was removed by filtration, washed with chlorobenzene, once with isopropanol, and dried in vacuo to obtain compound (III). FAB-MS m/z: 3055 ([M+H]$^+$).

EXAMPLE 5

Comparisons Between Compound (I), Irganox 1010 and Irgafos® 168 as an Antioxidant in PMMA Fabrication of samples: dissolving separately appropriate amounts of PMMA, compound (I), and two commercially available antioxidants, Irganox 1010 and Irgafos® 168, in an appropriate amount of tetrahydrofuran in flasks. Solution of PMMA and one or two solutions of antioxidant were mixed in predetermined ratios, and the mixture was poured into a Teflon plate. The mixture was dried at room temperature for four hours and at 60° C. in vacuo for 24 hours.

Oxidative induction time (OIT) test: the thermo-oxidative stability of the sample was assessed by differential scanning calorimeter (DSC) (PERKIN-ELMER DSC-7) to measure its oxidative induction time (OIT) that is the onset time of thermal oxidation occurs in the melt. The samples' weight were about 7 mg, the start temperature was 40° C., the final temperature was 280° C., the scan rate was 10° C./min, and N$_2$ to O$_2$ switches over were after 5 minutes at 280° C. thermal equilibrium (gas flow rate: 50 cm$^3$/min). The DSC results shown in FIG. 1. The code, composition, and OIT measured of each sample are listed in Table 1.

TABLE 1

| Sample code | PMMA (g) | compound (I) (g) | Irganox 1010 (g) | Irgafos ® 168 (g) | OIT (min) |
|---|---|---|---|---|---|
| PMMA | 1 | — | — | — | 2.1 |
| PMMA-0.5 | 1 | 0.05 | — | — | 23.5 |
| PMMA-1.0 | 1 | 0.010 | — | — | 28.7 |
| PMMA-1.5 | 1 | 0.015 | — | — | 32.6 |
| PMMA-2.0 | 1 | 0.020 | — | — | 32.7 |
| PMMA-1-0.5 | 1 | — | 0.005 | — | 20.8 |
| PMMA-1-1.0 | 1 | — | 0.010 | — | 21.5 |
| PMMA-1-2.0 | 1 | — | 0.020 | — | 23.1 |
| PMMA-12-1.0 | 1 | — | 0.020 | 0.011 | 23.6 |
| PMMA-12-2.0 | 1 | — | 0.020 | 0.022 | 22.8 |
| PMMA-12-4.0 | 1 | — | 0.020 | 0.044 | 18.2 |

EXAMPLE 6

Comparisons Between Compound (I) and a Commercially Available Antioxidant, P-EPQ®, in HTPB The procedures in Example 5 were repeated, excepted that PMMA was replaced by hydroxy terminated polybutadiene (HTPB), P-EPQ® was used as the commercially available antioxidant, and the final temperature of OIT measurements was 150° C. The code, composition, and OIT measured of each sample are listed in Table 2.

TABLE 2

| Sample Code | HTPB (g) | compound (I) (g) | P-EPQ ® (g) | OIT (min) |
|---|---|---|---|---|
| HTPB | 1 | — | — | very fast |
| HTPB-0.5 | 1 | 0.005 | — | 7.7 |
| HTPB-1.0 | 1 | 0.010 | — | 13.3 |
| HTPB-1.5 | 1 | 0.015 | — | 17.8 |
| HTPB-2.0 | 1 | 0.020 | — | 24.3 |
| HTPB-2-0.5 | 1 | — | 0.005 | 2.2 |
| HTPB-2-1.0 | 1 | — | 0.010 | 3.2 |
| HTPB-2-1.5 | 1 | — | 0.015 | 3.5 |
| HTPB-2-2.0 | 1 | — | 0.020 | 4.6 |

It can be seen from Tables 1 and 2 that the compound (I) of the present invention can effectively increase OIT of a polymer when it is added as an antioxidant, and has a performance superior than that of the commercially available antioxidants.

What is claimed is:

1. A polymer composition comprising a polymer and 0.01–5% of an antioxidant having a formula of (I), (II) or (III), based on the weight of said polymer:

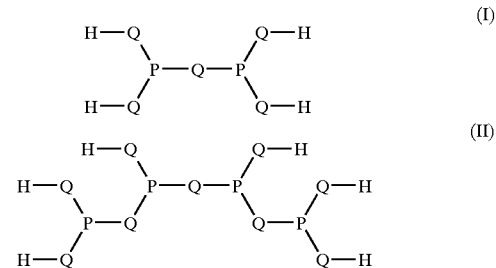

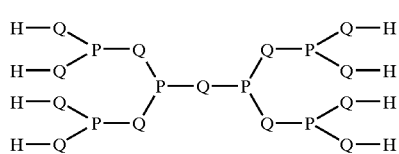
(III)

wherein Q is

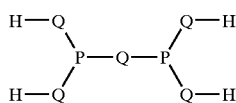

2. The polymer composition according to claim 1 comprising said antioxidant having the formula (I).

3. The polymer composition according to claim 1 comprising said antioxidant having the formula (II).

4. The polymer composition according to claim 1 comprising said antioxidant having the formula (III).

5. A compound having a structure represented by (I), (II) or (III):

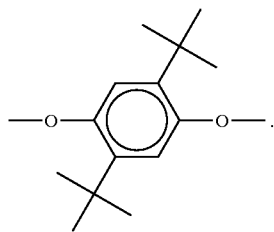
(I)

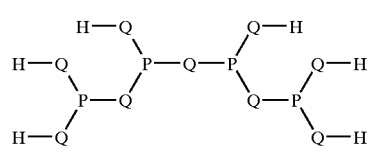
(II)

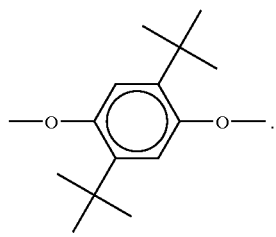
(III)

wherein Q is

6. The compound according to claim 5 having a structure represented by the formula (I).

7. The compound according to claim 5 having a structure represented by the formula (II).

8. The compound according to claim 5 having a structure represented by the formula (III).

* * * * *